United States Patent [19]
Thomas

[11] Patent Number: 5,714,865
[45] Date of Patent: Feb. 3, 1998

[54] PROCESS FOR SALVAGING DEAD NICKEL CADMIUM BATTERIES

[76] Inventor: Harold J. Thomas, 15149 E. Cerecita Dr., Whittier, Calif. 90604

[21] Appl. No.: 748,709

[22] Filed: Nov. 13, 1996

[51] Int. Cl.$^6$ .............................. H01M 10/42; H02J 7/00
[52] U.S. Cl. ................................................ 320/4; 429/39
[58] Field of Search .............................. 320/4, 20; 429/49

[56] References Cited

U.S. PATENT DOCUMENTS 4,839,248  6/1989  Magnussen, Jr. et al. ............... 429/49

*Primary Examiner*—Peter S. Wong
*Assistant Examiner*—Gregory J. Toatley, Jr.
*Attorney, Agent, or Firm*—Edgar W. Averill, Jr.

[57] ABSTRACT

A process for salvaging dead nickel-cadmium batteries. The process utilizes a circuit having positive and negative terminals which are connected to the terminals of the battery to be salvaged. The circuit is connected to a source of 110V A.C. voltage. This voltage is applied across the terminals of an electrolytic capacitor when a first momentary switch is depressed. The terminals of the capacitor also connect to the output terminals of the salvaging circuit through a second momentary switch. The battery is salvaged by first depressing the first momentary switch to charge the capacitor. Then the first momentary switch is released and the second momentary switch is depressed.

1 Claim, 1 Drawing Sheet

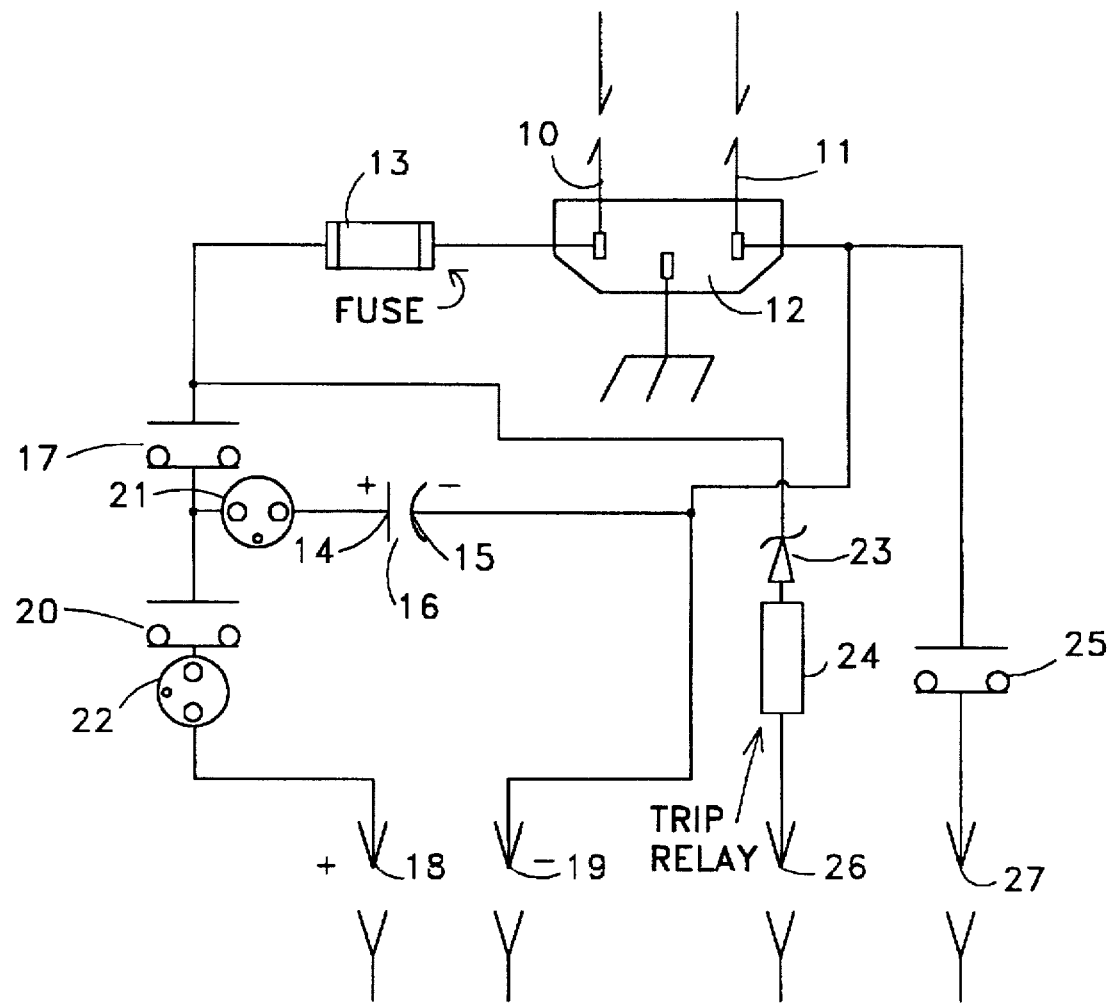

PROCESS FOR SALVAGING DEAD NICKEL CADMIUM BATTERIES

BACKGROUND OF THE INVENTION

The field of the invention is rechargeable batteries and the invention relates more particularly to the salvaging of batteries which have ceased to function.

Battery powered tools are becoming more popular with the advent of more efficient nickel cadmium batteries. Unfortunately, such batteries eventually cease to be chargeable and often the batteries must be discarded. Such batteries often cost $30–$40 and thus, the cost of replacement is substantial.

The problem of "memory" wherein a partially discharged nickel cadmium battery is recharged and then holds less of a charge is well known. Numerous patents disclose processes for recharging nickel cadmium batteries. Such patents include the Nor U.S. Pat. No. 5,179,335 which teaches a battery charger providing either a half wave or full wave rectified AC voltage supplied through an interruption circuit and current regulator to a battery to be recharged. Internal battery resistance is tested at intervals to assure that the charging current is not too large.

The Alexandres, et al. U.S. Pat. No. 5,196,779 teaches a control unit which provides a circuit for discharging a rechargeable battery to a desired level and then charging the battery. Simmonds U.S. Pat. No. 5,182,509 similarly discharges the rechargeable battery before charging. Keener, et al. U.S. Pat. No. 5,283,511 teaches a process for deep discharge prior to charge as well as automating the process for a wide range of battery types. Kendrick U.S. Pat. No. 5,334,925 drains a rechargeable battery prior to recharge. None of these circuits, however, face the problem of a rechargeable battery which is not capable of taking any charge, but instead are related to removing the memory from a battery which has been recharged many times.

BRIEF SUMMARY OF THE INVENTION

It is an object of the present invention to provide a process for salvaging dead nickel cadmium batteries.

The present invention is for a process for salvaging a dead nickel cadmium battery. The terminals of the battery are connected to the output terminals of a salvaging circuit. The salvaging circuit is connected to a source of 110 AC voltage. This voltage is imposed through a momentary switch to the terminals of an electrolytic capacitor. The terminals of the capacitor are also connected through a second momentary switch to the output terminals of the salvaging circuit. The process of the present invention includes the steps of depressing the first momentary switch to charge the electrolytic capacitor. The first momentary switch is then released and the second momentary switch is depressed to impose the charge of the capacitor across the terminals of the battery to be salvaged.

BRIEF SUMMARY OF THE DRAWINGS

The drawing shows a circuit useful in the process of the present invention.

DESCRIPTION OF THE PREFERRED EMBODIMENTS

While not wishing to be bound by any theory, it is believed that nickel cadmium (Ni-Cad) batteries become inoperative because of a buildup of a deposit between the positive and negative elements of the battery. Attempts to charge such a battery result in no significant charge and a tool with which such battery is used will take no charge and simply operate for a very short period of time or not at all. Typically at this point such batteries are thrown out and new batteries having a cost of around $30–$40 are purchased to replace the unchargeable batteries. Often the rechargeable battery is an integral part of the tool and the entire tool must be discarded.

The circuit shown in the drawings imposes a brief low amperage charge across the terminals of the battery to be salvaged and has proved successful in returning a battery to a chargeable condition from a condition when the battery would accept no charge at all.

Household 110V AC voltage is imposed across terminals 10 and 11 of plug 12. This voltage is imposed across the terminals 14 and 15 of electrolytic capacitor 16 by the closing of first momentary switch 17. Electrolytic capacitor 16 is preferably between 30 and 60 microfarads, 240V. A fuse 13 protects the circuit in the event of a short-out of capacitor 16. When momentary switch 17 is released (typically after 1 to 2 seconds) the capacitor 16 is charged. As momentary switch 17 is held down, neon lamp 21 gets brighter to indicate the charging of the capacitor 16. A Ni-Cad battery to be salvaged is connected across terminals 18 and 19 which comprise the output terminals of the circuit. Next, momentary switch 20 is closed and a high voltage/low amperage charge is imposed across the terminals of the battery. This charge is believed to burn out or otherwise dissipate deposits within the battery which have prevented the charging of the battery. Neon lamp 22 lights briefly as switch 20 is closed and the current passes through the battery to be salvaged.

A second portion of the circuit includes terminals 26 and 27 which is used first to determine whether or not the battery to be salvaged is shorted out. If the battery is shorted out completely, it can damage the charger. In order to determine the presence of a short, the battery is connected across terminals 26 and 27 and momentary switch 25 is closed. If the battery is completely shorted, current will trip relay 24 which is in series with Zener diode 23. Zener diode 23 steps down the voltage to between 12 and 25 volts. Relay 24 is tripped when the current is greater than about 1 amp. The tripped red button on relay 24 will indicate the presence of a short.

The use of the process of the present invention has been successful in salvaging numerous Ni-Cad batteries which were believed to be dead. The circuit is of low cost construction, easy to use and is capable of adding substantial life to battery operated tools and other battery operated devices.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A process for salvaging a dead nickel-cadmium battery, said battery having a positive terminal and a negative terminal, said process comprising the steps of:

connecting the positive and negative terminals of a battery to be salvaged to the output terminals of a salvaging circuit connected to a source of 110 AC voltage, said salvaging circuit having a first momentary switch which during a closed condition will impose said voltage across the terminals of an electrolytic capacitor having a capacitance of between 30 and 60 microfarad and charge said capacitor and said output terminals of said salvaging circuit being connected to the terminals of said capacitor through a second momentary switch;

depressing said first momentary switch and maintaining said depressing for a period of between 1 and 2 seconds;

releasing said first momentary switch;

depressing said second momentary switch; and removing the nickel-cadmium battery from said output terminals.

\* \* \* \* \*